US012400555B2

(12) United States Patent
Cross

(10) Patent No.: US 12,400,555 B2
(45) Date of Patent: Aug. 26, 2025

(54) SYSTEM AND METHOD FOR DETECTING ACADEMIC DISHONESTY AND INITIATING CORRECTIVE/DISCIPLINARY ACTIONS

(71) Applicant: CHIRON PROPERTIES, LLC, Columbia, MD (US)

(72) Inventor: Clay Cross, Fulton, MD (US)

(73) Assignee: CHIRON PROPERTIES, LLC, Columbia, MD (US)

( * ) Notice: Subject to any disclaimer, the term of this patent is extended or adjusted under 35 U.S.C. 154(b) by 0 days.

(21) Appl. No.: 18/472,481

(22) Filed: Sep. 22, 2023

(65) Prior Publication Data

US 2024/0105073 A1 Mar. 28, 2024

Related U.S. Application Data

(60) Provisional application No. 63/409,292, filed on Sep. 23, 2022.

(51) Int. Cl.
*G09B 7/00* (2006.01)
*G06F 21/64* (2013.01)

(52) U.S. Cl.
CPC ............. *G09B 7/00* (2013.01); *G06F 21/64* (2013.01)

(58) Field of Classification Search
CPC .. G09B 5/00; G09B 7/00; G06F 21/64; G06Q 50/20
See application file for complete search history.

(56) References Cited

U.S. PATENT DOCUMENTS

| 11,417,339 | B1 | 8/2022 | Wang et al. |
| 2017/0039869 | A1 | 2/2017 | Gleim et al. |
| 2018/0061254 | A1 | 3/2018 | Amigud |
| 2018/0232830 | A1* | 8/2018 | Dorenkamp ......... G06Q 50/205 |
| 2020/0279223 | A1* | 9/2020 | Sarab ....................... G09B 7/00 |
| 2022/0114901 | A1 | 4/2022 | Biggin et al. |
| 2024/0038047 | A1* | 2/2024 | Schmid .................... G09B 7/00 |

FOREIGN PATENT DOCUMENTS

| CN | 109165040 A | 1/2019 |
| CN | 112116505 A | 12/2020 |

* cited by examiner

*Primary Examiner* — Kang Hu
*Assistant Examiner* — Correll T French
(74) *Attorney, Agent, or Firm* — Saul Ewing LLP

(57) ABSTRACT

Disclosed is a system and method for detecting academic dishonesty and initiating corrective or disciplinary actions is presented. The present invention relates to a method of detecting academic dishonesty and initiating corrective or disciplinary actions. The invention is particularly suited for practical examinations where a student or other person being tested, i.e., any test taker, is tasked with solving a problem which, when solved correctly, gives the student access to a "flag value" (an answer) that the student discovers/finds and submits as his or her "student response." In this application the terms "student" and "test-taker" are used interchangeably. If the student submits the correct student response they are identified as having solved the problem, whereas if they do not submit the correct response (either by submitting no response or by submitting an incorrect response) they are identified as having failed to solve the problem.

3 Claims, 2 Drawing Sheets

SYSTEM AND METHOD FOR DETECTING ACADEMIC DISHONESTY AND INITIATING CORRECTIVE/DISCIPLINARY ACTIONS

CROSS-REFERENCE TO RELATED APPLICATIONS

This application claims the priority to U.S. Provisional Application No. 63/409,292, filed on Sep. 23, 2022, the entire contents of which being fully incorporated herein by reference.

BRIEF SUMMARY OF THE INVENTION

A system and method for detecting academic dishonesty and initiating corrective or disciplinary actions is presented. The present invention relates to a method of detecting academic dishonesty and initiating corrective or disciplinary actions. The invention is particularly suited for practical examinations where a student or other person being tested, i.e., any test taker, is tasked with solving a problem which, when solved correctly, gives the student access to a "flag value" (an answer) that the student discovers/finds and submits as his or her "student response." In this application the terms "student" and "test-taker" are used interchangeably. If the student submits the correct student response they are identified as having solved the problem, whereas if they do not submit the correct response (either by submitting no response or by submitting an incorrect response) they are identified as having failed to solve the problem.

The detection of academic dishonesty is accomplished by generating flag values with a low statistical probability of repetition in an isolated student network, which can be verified as authentic by an assessment system using shared secrets, without the need for any other interaction between the assessment system and the student network. Flag value collisions (i.e., situations where the same flag value is generated as the correct answer to be discovered by two or more students) are sufficiently rare so that if one occurs, it provides strong indications of students sharing answers. When duplicate answers are detected, it alerts course managers to generate corrective action, and generates an audit trail which reasonably identifies the student network in which the flag was initially generated, with the security and integrity assumptions made. The system makes configurable tradeoffs between collision frequency and student convenience by varying the length of the string representing the flag value as discussed further below.

In its most basic form, the present invention involves the creation and placement of unique answers that are discoverable by a test taker during a practical exam, whereby if the test taker completes a task properly, the unique answer is revealed to them, and they submit the answer as their response. Since each test taker would discover a unique answer when completing the same task, if two test takers submit the same answer, it is indicative of dishonesty (cheating) and the students are flagged for investigation and if appropriate, discipline.

In a simplistic example, if the task that students are being taught is how to gain access to a safe without knowing the combination of the lock on the safe, each student would have a safe to try to access, and each safe would have, for example, a document containing an answer within it, and each document would have a different answer on it. If two students submit the same answer, it will be known by the testing entity that one or both of the students cheated, and they will be able to investigate to identify how the cheating occurred and who is culpable.

In a preferred embodiment, the task involves a computer security task, such as locating within a test platform a file containing malware or identifying a password to access a particular file residing on the test platform. The unique answers are generated and populated within the test platform, and the assessment of the answers provided and the identification of potential dishonesty is all performed via an assessment system isolated from the test platforms.

It is understood that a person of ordinary skill in the art can use these same principles in any kind of environment where the "testing" involved is the completion of a task and the "answer" discovered upon completing the task can be unique for each test subject, and would still fall within the scope of the claimed invention.

BRIEF DESCRIPTION OF THE DRAWINGS

An example of the invention is shown in the attached drawings, in which.

DETAILED DESCRIPTION OF THE INVENTION

Figure 1:
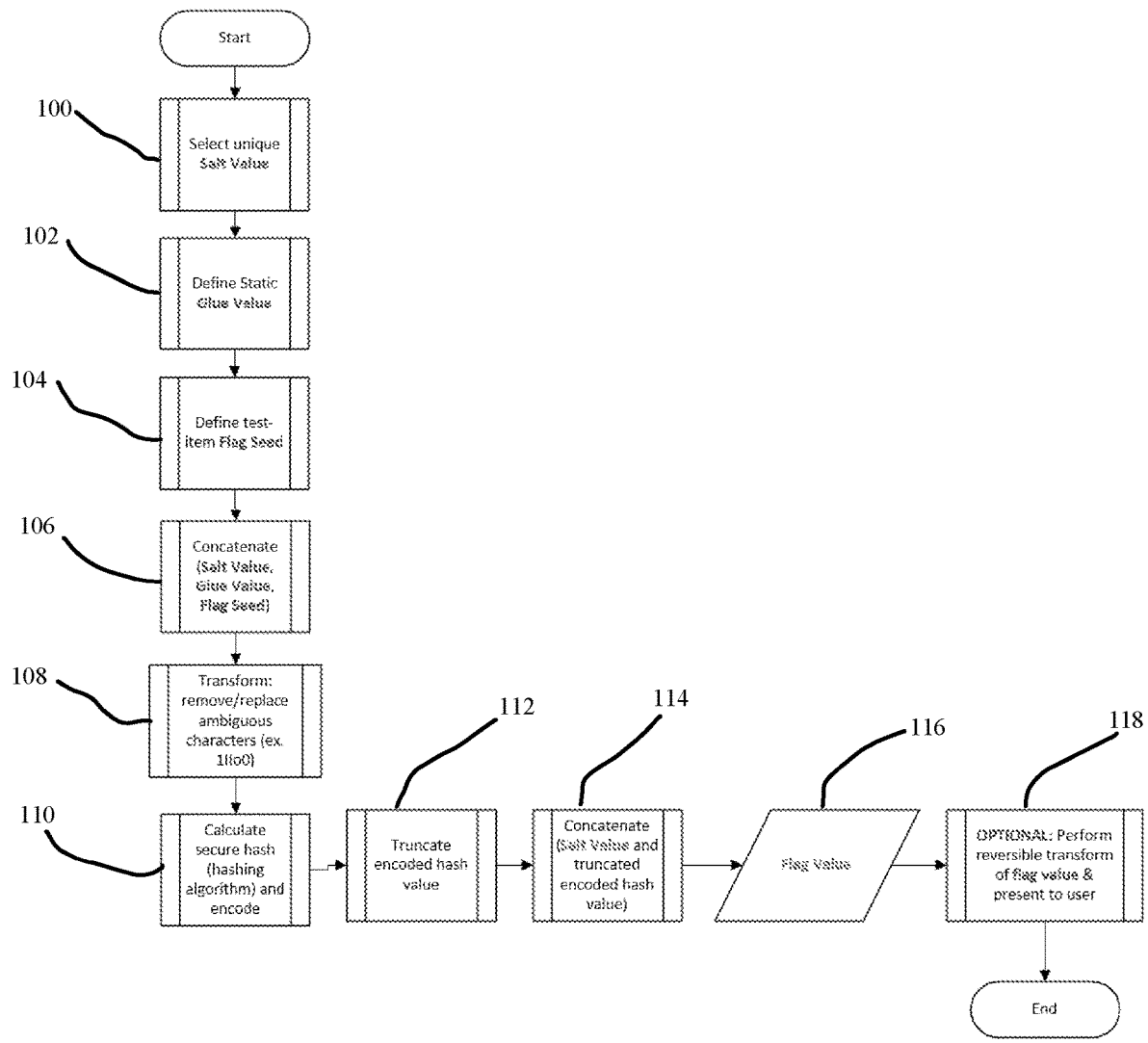
FIG. 1 is a flowchart illustrating a flag generation algorithm in accordance with an embodiment of the present invention.

Following is a detailed description of the implementation and use of the invention in a computer/software network environment. The following terms used in the present application are defined as follows:

| Term | Definition |
| --- | --- |
| Flag Value | The unique string that results from executing flag code and is verified by check code |
| Student Network | a network of computers accessed and utilized by students |
| Assessment System | a set of measures that collects and analyzes data on applicant qualifications, candidate and graduate performance, and unit operations to evaluate and improve the performance of candidates, the unit, and its programs |
| Check Code | A computer program or script run on the assessment system which validates a flag value and detects duplicate answers. |
| Flag Code | A computer program or script which generates and places a flag value into a target location. |

-continued

| Term | Definition |
| --- | --- |
| Check Algorithm | a set of instructions or rules designed to solve a definite problem, in this case to check the student response against prior responses |
| Corrective Action | a fix for an existing problem or nonconformance |
| Generation Algorithm | a set of instructions or rules designed to solve a definite problem, in this case to generate a flag value |
| Content Developer | a person who gathers information, writes, organizes, and edits content for marketing or publication on various websites |
| Test Taker | an individual authorized to take a test, e.g., a student who is being tested on subject matter they have been taught |
| Item Prompt | an item prompt instructs the user to input some text |
| Flag Seed | an input to a pseudorandom number generator |
| Length Option | a specified number of characters in a value |
| Salt Value | a value generated by a cryptographically secure function or determined based on user identifiers, that is added to the input of hash functions to create unique (per user) hashes for every input, regardless of the input not being unique |
| Glue Value | a secret value shared between generation algorithm and the check algorithm, but remains constant, unlike the flag seed that changes for every flag |
| Test-taker/Student Response | a response entered by a test-taker/student (or anyone who is being tested) |
| Hash Value | a hash value is the transformation of a string of characters into a usually shorter fixed-length value or key that represents the original string |
| Beacon Server | a standalone Linux virtual machine |

Within a course all students receive the same instruction by completing the same learning activities using the same resources. Practical learning activities take place within an isolated network, separate from the learning management system or assessment system. Within graded assessments, students must demonstrate their ability to personally meet learning objectives, rather than copy the work of another student.

The desired outcome of the present invention is to deter student cheating, detect when students attempt to submit an answer discovered by another student, and initiate corrective actions such as disenrollment or disciplinary action.

In order for this to be accomplished, it is desirable that this be accomplished even when the assessment system not communicate directly with the student network, and all student networks should be isolated from any other student network. Further, students should have complete access to a workstation within the student network, including installed reverse engineering and analysis tools.

The solution of this embodiment of the present invention involves the tester installing check code within the assessment system and flag code within the student network. Check code implements the check algorithm to confirm if the test taker entered a correct answer, whether anyone has entered this answer before, and generates the alert, which initiates corrective action. Flag code implements the generation algorithm to output a unique flag value. Flag codes can be customized to execute the generation algorithm when the conditions specified by the content developer are met and output the flag value to a location where the test taker can observe it if they discover/find it. Additionally, the flag code logs the flag value to a relatively secure place intended to be inaccessible by the test taker under normal conditions.

The content developer designs test items by writing an item prompt and human-readable flag seed and entering them into an assessment system. The content developer also customizes the flag code to execute the generation algorithm when the student network environment meets specified conditions. The content developer also embeds the flag seed and installs the flag code into the student network.

The overall solution includes a library of flag code samples to simplify the process of customizing code to check for specific conditions and installing the flag code in common environments. While modifications are not limited to the flag code samples included in the overall solution, these samples implement deployment strategies that may be utilized in a variety of scenarios to start execution and write out flag values with an acceptable risk of exposure to the flag code or flag seed.

The present invention will not attempt to prevent or detect all forms of cheating. Instead, the present invention detects duplicate answers and provides a method of auditing whether a flag value was generated within a particular student network.

Flag values may not be unique, but the statistical likelihood of flag value collisions is controllable by using different length options within the check algorithm and generation algorithm. Longer length options increase the likelihood of errors in flag value entry into the assessment system, and shorter length options increase the likelihood of flag value collisions. The tester must determine the balance of risk between these two states when they deploy the flag code.

Values submitted by students into the assessment system are inaccessible to any other student.

Flag seeds and flag codes are not readily accessible to the test taker. The risk of exposure is acceptable if the process used to read flag seeds or flag code is significantly more difficult than completing the test item without cheating.

The assessment system stores a record of all previous answers to any test item and associates those items with the assessment instance and test taker who completed the assessment.

FIG. 1 illustrates a flag generation algorithm in accordance with the present invention. The flag generation algorithm is executed within the student network. It follows the process below.

1) Select a suitably unique salt value matching the selection length option (step 100).
   a) Methods for selecting this salt value include:
      i) Use a source of randomness from the operating system or system library
         (1) This method requires no external information from, or connection between, the student network and the assessment system.
         (2) Encode the random data into the base64 character set. The number of bits of randomness must be sufficient to generate a base64 string long enough to meet the desired length option.
      ii) Begin with some shared identifier, such as a username, user ID, email address, or other unique identifier.
         (1) Transform the unique identifier into a salt value using a repeatable process, such as:
            (a) Concatenate the shared identifier and the flag seed together
            (b) Calculate a cryptographically secure has if the combination
            (c) Encode the hash into the Base64 character set
            (d) Truncate the length of the hash to match the desired length option.
         (2) This method requires the assessment system and the student network both have a copy of the shared identifier.
2) Define the static glue value (Step 102).
   a) The glue value may be any string, including the null string. It is one of two secrets shared between the assessment system and the student network. The glue value is a static secret that remains constant across the flag code for all test items.
3) Define the test-item specific flag seed (Step 104).
   a) The flag seed may be any non-empty string. It should be unique to the test item and memorable for the content developer.
4) Concatenate the salt value, glue value, and flag seed strings together (Step 106).
5) Remove/replace ambiguous characters (Step 108).
6) Calculate a cryptographically secure hash of the concatenated value using a hashing algorithm such as sha256 and encode the hash using the base64 character set (Step 110).
7) Truncate the encoded hash value to create a string with a length matching the length option (Step 112).
8) Concatenate the salt value and the truncated encoded hash value to create the final flag value (Steps 114 and 116).
   a) The resulting string should be exactly double the length option and use the base64 character set.
9) Optionally perform a reversible Transform on the flag value to present it to the user in the most appropriate format (Step 118).
10) Output the (optionally transformed) flag value.

Figure 2:
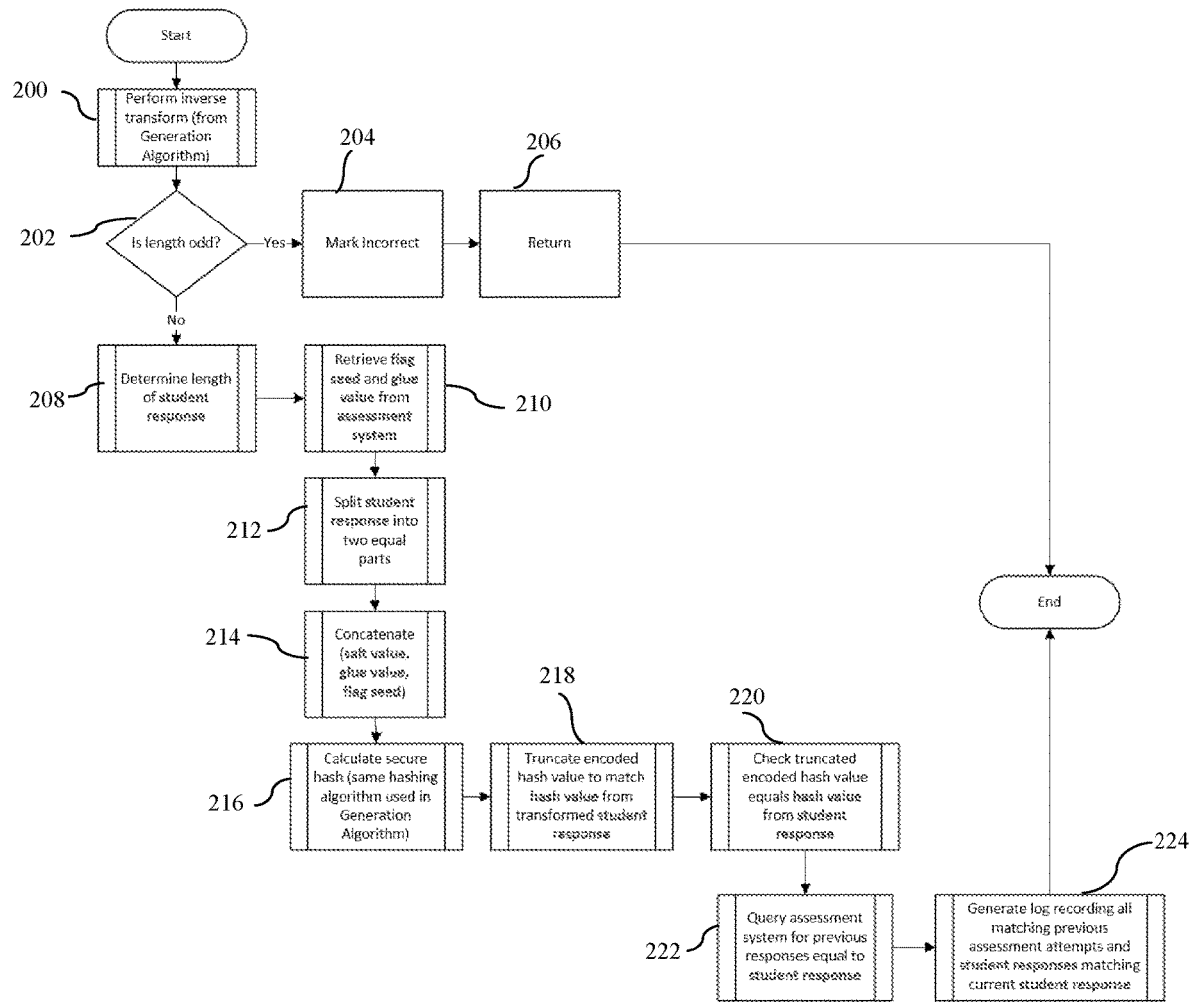
FIG. 2 is a flowchart illustrating a check algorithm in accordance with an embodiment of the present invention.

FIG. 2 is a flowchart illustrating a check algorithm in accordance with the present invention. The check algorithm runs on the assessment system and takes a student response as its input. It follows these steps:
1) Perform the inverse of any transform applied in the generation algorithm (Step 200).
2) Determine if the length of the student response is an odd number (Step 202).
3) If the length is an odd number (i.e., not divisible by two), then grade the correction as incorrect (Step 204) and return (Step 206).
4) If the length of the student response is an even number, then determine the length of the student response (Step 208).
5) Retrieve the flag seed and glue value from the assessment system (Step 210).
   a) The flag seed and glue value are the two shared secrets between the student network and the assessment system and must be set before the check algorithm is executed.
6) Split the student response into two equal parts (Step 212).
   a) Label the first part as the salt value and the second part as the hash value.
7) Concatenate the salt value, glue value, and flag seed together (Step 214).
8) Calculate a cryptographically secure hash of the concatenated value using the same hashing algorithm used in the generation algorithm and encode the hash using the base64 character set (Step 216).
   a) If the length of the of the encoded hash value is shorter than the length of the hash value extracted from the student response, grade the answer as incorrect and return.
9) Truncate the encoded hash value to create a string with a length matching the length of the hash value extracted from the student input (Step 218).
10) Check if then truncated encoded hash value equals the hash value extracted from the student response (Step 220).
    a) If the two values are not equal, grade the answer as incorrect and return.
    b) Grade the answer as correct.
11) Query the Assessment system database for previous responses equal to the student response (Step 222).
    a) If no values are found, return.
12) Generate a log in the assessment system recording all matching previous assessment attempts and student responses that match the current student response (Step 224).

The check code is implemented as a plugin in the Moodle Learning Management system (or other learning management system), specifically as a new question type, and modifications to a standard Moodle Block plugin. In this example it is written in PHP and implements the check algorithm above for the most part. When customer reports are generated, the check code searches for duplicate answer logs and generates a high priority alert which it displays to the course manager at the time the report is generated. The alert includes all student and exam attempts involved in the duplicate answer.

The check code inverts the transform performed by the flag code by replacing the special characters outside the base64 character set with the original, optically ambiguous character '1' 'l' 'o' 'O' or '0'.

In some instances, design decisions have been made which vary slightly for the process, for example, rather than allowing a salt value of arbitrary length determined by the length option, the check code only implements a length option of 5.

In a preferred embodiment, the primary method of deploying flag code into the student network is via a standalone Linux virtual machine known as the beacon server. The beacon server is the only location within the student network where the glue value and flag seeds are stored, which meets the security requirements for the system components.

The beacon server does not listen on any ports and limits any processing of components of the environment which the test taker can control by comparing those values to static strings. While not thoroughly protected against exploitation, the beacon server meets the requirement of being more difficult to attack than performing the steps in a test item. If it becomes apparent that the security of the beacon server has been compromised, changing the glue value, modifying the check code, and modifying/redeploying the flag code will mitigate the effects of the compromise without requiring all test items to be rewritten.

The flag code transforms the value by replacing the optically ambiguous characters '1' 'l' 'o' 'O' and '0' with more easily distinguished characters outside of the base64 character set.

An alternative method of deploying the flag code is installing a self-deleting script file within the student network on target virtual machines and arranging it to execute at system boot. The VM is then imaged and deployed to the student network. When it is first powered in within the student network, the flag code generates the flag values. It outputs them to appropriate locations within the student network, such as event logs, registry keys, or files on disk, before deleting itself.

Variants of this method exist for Windows and Linux-based systems. When used, the glue value and flag seed are both present within the student network on target virtual machines to which the student has full access. In these cases, the requirement that the flag code be more difficult to attack than performing the steps in the test items is met by ensuring the sensitive data is deleted from the disk within seconds of system start-up. This method of deploying the flag code is less secure than using a beacon server but is available when one-time updates are preferred, and the flag code is checked thoroughly.

The following example illustrates the invention and why, in the preferred embodiment, the student (lab) network and assessment should be separate.

Ally Allstar, Bobby Badguy, Charlie Confident, Dwane Dogood, and Garry Goofoff are all students of Chiron Technology Services. They have been trained to stop ransomware from spreading through a network, and are taking their final assessment. The malware used in the assessment is real and very dangerous. To be sure that the ransomware does not spread out of control, the assessment is performed on a completely separated network, with no connection between each student's individual, infected lab network and the secure system where the student fills out the test answers. As will be seen, this separation ends up being quite important, because when Charlie Confident attempted the assessment, he wasn't quite as ready as he thought he was, and the ransomware overran his entire lab network, destroying every system it was connected to. Because of the isolation inherent in the design of the lab networks, no other students were impacted and the secure system was not affected.

Due to the complete isolation between the student infected lab networks and the test administration system, the system of the invention is incorporated into the assessment, which means when the students lab network was prepared for their test, Allie had the value 'Aa1!Aa1!AA' stored within one of the files she was tasked to identify and access in order to resolve the problem caused by the infected code. In his copy of the same file, Bobby had the value 'Bb2@Bb2@BB', Dwane and 'Dd4$Dd4$DD' and Garry had the value "Gg7&Gg7&GG". Upon stopping the ransomware, Ally and Dwane, both honest students, read their unique flag values from the infected network and enter them into the secure test administration system. Due to the strict security partition between the two networks, there is no way that the assessment system can verify that Ally actually had the value 'Aa1!Aa1!AA' or Dwane had the value 'Dd4$Dd4$DD' stored in the file, but Lab Secure makes it possible to verify that both of these answers are indeed correct.

Bobby, a dishonest but high performing student, successfully stops the ransomware as well, and discovers his answer. Garry is unable to stop the ransomware and asks Bobby to share his answer to the question, which Bobby does. Bobby and Garry both enter the value 'Bb2@Bb2@BB' as answers to the assessment system. Still unable to determine what value was actually stored on each students infected lab network, the assessment system validates that both students answered correctly, but that the duplicate answer indicates academic dishonesty. It also delivers a visual alert to the instructor and course manager indicating academic dishonesty has been detected, including details about when and by whom. Meanwhile, the part of the system operating independently within the infected lab environment records the actual answers embedded in both student's environment and displays that information to the instructor for comparison to the answers entered into the assessment system, serving as a secondary validation of academic integrity. The details provided in the alert and verified within the lab environment enable the course manager to take corrective action against both the giver and receiver the shared information The above-described steps can be implemented using standard well-known programming techniques. The novelty of the above-described embodiment lies not in the specific programming techniques but in the use of the steps described to achieve the described results. Software programming code which embodies the present invention is typically stored in permanent storage. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, FIGS. 1-2 support combinations of means for performing the specified functions, combinations of steps for performing the specified functions, and program instruction means for performing the specified functions.

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

I claim:

1. A method of detecting academic dishonesty in connection with a practical examination, comprising:
   presenting, to a plurality of test takers, a problem requiring a completion of a task, whereby if a test taker from the plurality of test takers successfully completes the task, the test taker discovers a flag value from a plurality of flag values;
   transmitting, from each test taker from the of said plurality of test takers, the plurality of flag values to an assessment system, each of the plurality of test takers operating in an isolated network from a plurality of isolated networks;
   analyzing, via the assessment system, the plurality of flag values to determine, via shared secrets and without communicating with the plurality of isolated network, duplicate flag values from the plurality of flag values, the duplicate flag values indicating that different test takers were operating in the same isolated network and that academic dishonesty has occurred.

2. A method of detecting academic dishonesty in connection with a practical examination, comprising:
   executing a set of instructions to generate a plurality of unique flag values;
   populating a test platform with the plurality of unique flag values such that completion of a task by a test taker from the plurality of test takers reveals a unique flag value from the plurality of unique flag values to the test taker, the plurality of test takers operating on a plurality of isolated networks;
   presenting, to the plurality of test takers, a problem requiring the completion of the task, whereby if the test taker successfully completes the task, that test taker discovers a flag value from the plurality of unique flag values, the flag value associated with the completion of the task and an isolated network from the plurality of isolated networks that the test taker completed the task in;
   receiving, from the plurality of test takers, a plurality of flag values in response to the completion of the task;
   determining, via shared secrets and without communicating with the plurality of isolated network, duplicate flag values from the plurality of flag values, the duplicate flag values received from different test takers indicating that different test takers were operating in the same isolated network and that academic dishonesty has occurred; and
   generating a corrective action to identify the isolated network associated with the duplicate flag values from the different test takers.

3. A system for detecting academic dishonesty in connection with a practical examination, comprising:
   a test platform including a first processor and a first input device;
   an assessment system in communication with, but physically isolated from, the test platform, the assessment system including a second processor and a second input device;
   wherein the second processor is configured to:
      create a plurality of unique flag values;
      populate the test platform with the plurality of unique flag values such that a completion of a task by a test taker from a plurality of test takers reveals a unique flag value from the plurality of flag values to the test taker; and
      present, to the plurality of test takers, a problem requiring the completion of the task, whereby if the test taker successfully completes the task, the test taker discovers the unique flag value associated with the completion of the task and an isolated network from a plurality of isolated networks the test taker completed the task in;
   wherein the first processor is configured to:
      enable submission, by each test taker from the plurality of test takers, of the discovered unique flag value from the plurality of unique flag values to the assessment system; and
   wherein the assessment system is configured to:
      analyze the submitted unique flag values to determine, via shared secrets, submission of two identical flag values by two different test takers.

* * * * *